March 18, 1958
J. RABINOW
2,827,594
COLOR DISCRIMINATING HEADLIGHT DIMMER
Filed Sept. 2, 1954
2 Sheets-Sheet 1
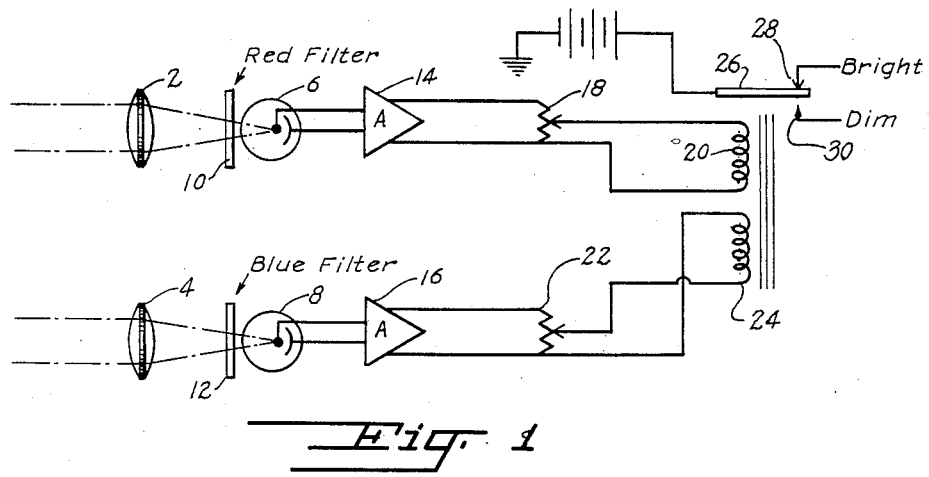
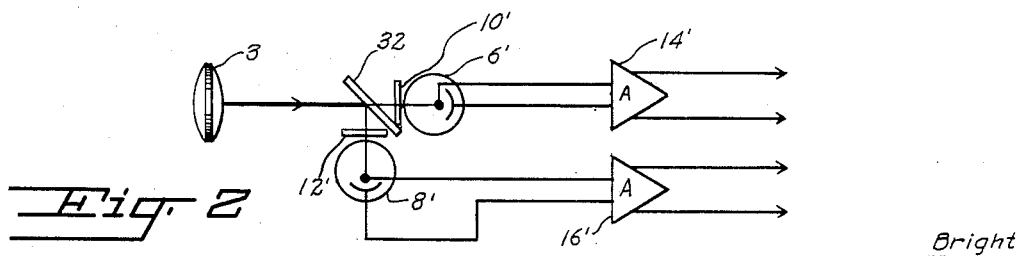
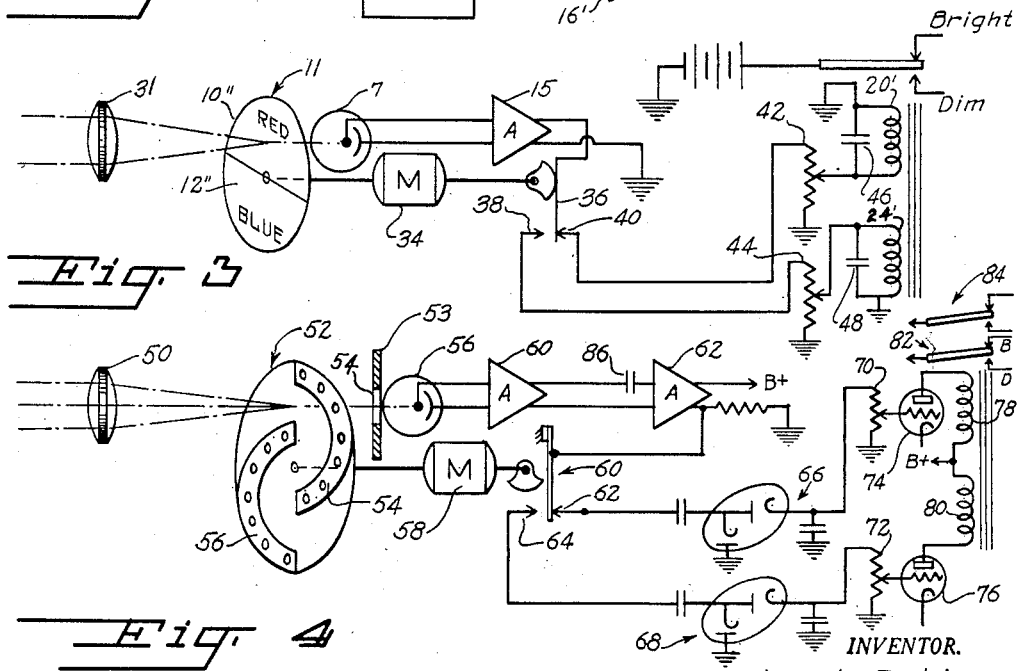
INVENTOR.
Jacob Rabinow
BY Max L. Libman
Attorney INVENTOR.
Jacob Rabinow
BY Max L. Libman
Attorney United States Patent Office 2,827,594
Patented Mar. 18, 1958

2,827,594

COLOR DISCRIMINATING HEADLIGHT DIMMER

Jacob Rabinow, Takoma Park, Md.

Application September 2, 1954, Serial No. 453,864

11 Claims. (Cl. 315—83)

This invention relates to headlight dimmers for automobiles which lower or dim the headlight when the device detects the lights of another car in the field of illumination of the headlights it controls.

All of the prior headlight dimmers of which I have knowledge suffer in at least one of two respects. Either they are not sufficiently sensitive to detect the tail lights of a car ahead at sufficient distance to dim the headlights so as not to blind the driver of the car ahead by the reflection of the headlights in his rearview mirror, or, if the sensitivity of the headlight dimmer is increased to a point where it is sufficient to detect the tail lights of the other car at a suitable distance, the sensitivity is then so high that the device detects the headlights of another car at distances too great to be safe. The use of red or other single color filters to equalize the sensitivity to tail and headlights helps only slightly. Even through a red filter the headlights of a car are so much brighter than the tail lights that the correct relationship between the sensitivity to tail lights and that to headlights is impossible of achievement. It is an object of my invention to overcome this difficulty by making the headlight dimmer as sensitive as required to the tail lights of a car without increasing its sensitivity to the headlights. In fact, it is possible to make the sensitivity to tail lights very great and to make the sensitivity to headlights zero. It is a further object of my invention to make a headlight dimmer which is controlled not only by the intensity of a source of light but by its color or colors as well.

The specific nature of my invention as well as other objects and advantages thereof will clearly appear from a description of a preferred embodiment as shown in the accompanying drawings, in which:

Fig. 1 is a schematic diagram showing the basic principle of the invention;

Fig. 2 is a modification of the arrangement shown in Fig. 1;

Fig. 3 is a modification showing the use of a single amplifier;

Fig. 4 shows a modification of the invention employing scanning;

Figure 5:
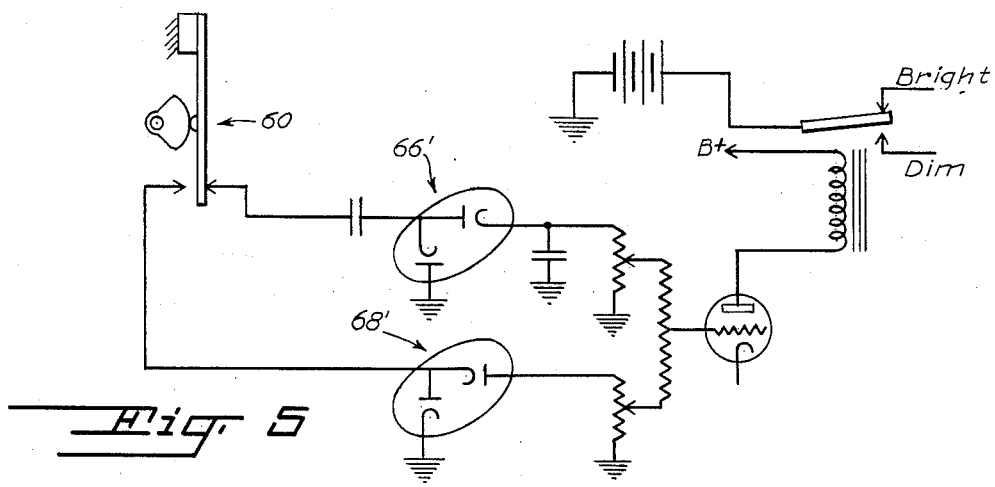
Fig. 5 shows a modification of Fig. 4 using a single-winding relay and a differential voltage arrangement.

Fig. 1 shows a simple embodiment of my invention. Two lenses 2 and 4 produce two respective similar images of the field of view on two photocells 6 and 8. Lens 2 forms its image on photocell 6 through a red color filter 10, while lens 4 forms its image on the photocell 8 through a blue color filter 12. The photocells 6 and 8 are fed to their amplifiers 14 and 16 respectively. The output of amplifier 14 is connected to a gain control 18 which feeds one coil 20 of a two-coil relay. The output of the other amplifier 16 is fed through a gain control 22 to a second coil 24 on the same relay. The coils are so connected that an increase in light on the "red" photocell 6 acts through coil 20 to pull the armature 26. This shifts the contact from the "Bright" position shown at 28 so as to make contact with 30, thus dimming the lights. The other coil 24 is so connected to its circuit that an increase of current through it opposes the rise of current in coil 20 and thus inhibits the action of the relay.

The action of the whole device is thus as follows: When the dimmer is looking at a source of red light only, the photocell 8 does not appreciably get any light because of the blue color filter 12. The inhibiting action of coil 22 does not occur. The red light, however, passes easily through the red color filter 10 and impinges on the photocell 6, thus increasing the current through the coil 20, and operating the relay. By adjusting the two gain controls 18, 22, the sensitivity of the combination of the two photocells and their amplifiers can be so set that the sensitivity to the white light of an oncoming headlight can be kept lower than the sensitivity to a red light such as that emitted by a tail light of an automobile. This difference in sensitivity is necessary in order that the dimmer may "pick-up" the tail light of a car when two cars follow each other at some considerable distance, usually of the order of 200 to 400 feet, so as not to cause discomfort to the driver of the car ahead because of reflection of the headlights of the dimmer equipped car in his rear-view mirror. When the sensitivity of a non-color discriminating headlight dimmer is made high enough to accomplish this, its sensitivity is found to be much too high for oncoming headlights even if a red color filter is used over its lens. This is so because the oncoming headlights also contain a great deal of red light with an intensity so much higher than that of the tail lights that the oncoming headlights can be "picked up" at a distance far too great for safety. In my invention, however, the sensitivity to the colored tail lights of a car can be kept as high as required while the sensitivity to the headlights can be independently reduced to any desired figure.

Fig. 2 shows another embodiment of my invention where a single lens 3 is used, but the light is split by a half-silvered mirror 32 on to two photocells through the two required color filters. The operation of the device otherwise would be similar to that of Fig. 1, and similar reference characters, with primes (') added are used for corresponding elements. Objections can be raised to the embodiments of my invention shown in Figs. 1 and 2 not only because two photocells and two lens systems are required in each, but also because the gains of the two channels may change unequally, thus disturbing the balance of the adjustments of the device.

A method of eliminating this difficulty is shown in the embodiment shown in Fig. 3. Here a single lens 31, a single photocell 7, and a single amplifying channel 15 are used. A revolving color filter 11 is placed ahead of the phototube. This filter consists of two semi-circles 10" and 12" respectively of red and blue color filtering material. This revolving color wheel is driven by motor 34 which also drives a commutating switch consisting of three contacts 36, 38 and 40. The output of the amplifier is fed to the center contact 36 of this commutator. Contact is closed at 40 when the red filter is in front of the photocell, thus feeding the output of the amplifier 15 to the winding 20' of the relay. When the blue segment of the revolving wheel is in front of the photocell 7 the output of the amplifier is fed through contacts 36, 38 to the bucking coil 24' of the relay.

If a red light is being seen by the headlight dimmer, the output of the amplifier will be large when the red filter is in front of the photocell, and negligible when the blue filter takes its place. This will produce a large current in the winding 20' of the relay and a negligible current in the bucking winding 24'. When the light intensity reaches a predetermined level, the relay will operate and dim the headlights. When a white light, however, impinges on the lens there will be outputs during both halves of the revolution of the disc 11 and currents will appear in both windings of the relay. The relative magnitude of these currents can be adjusted by the control resistors 42, 44. The capacitors 46 and 48 are shunted across the respective relay coils to smoothen the current flow in each coil and to eliminate chattering that would otherwise result. In the manner thus described the sensitivity to the white light can be reduced to any desired figure so that the sensitivity to headlights can be kept from being too great while the sensitivity to tail lights is adequate. As can be seen, in this embodiment only a single photocell is used together with a single amplifier so that changes in gain of these components cannot affect the relative sensitivity to headlights and tail lights. The overall sensitivity, however, can vary as it does in any headlight dimmer, and this problem has to be treated by proper voltage regulation and stabilization of components as it must be in all other devices of this general type.

All of the embodiments of my invention so far described, while being simple, suffer from the difficulty that is present in all non-scanning types of headlight dimmers. They "see" all of the field of view at one time and are thus affected not only by the energy arriving from the lights of another car, but also by all of the extraneous light in the field of view. This includes light from the sky, illuminated signs, groups of street lights or other lights, and, worst of all, the reflected light of its own headlights. The method of overcoming these difficulties which is covered by the U. S. Patent No. 2,632,040, issued to me is to examine the field of view in small sections. Although this can be done in many ways, the most practical, perhaps, is by the use of scanning.

Referring now to Fig. 4, light from the field of view of the car on which this device is mounted is gathered by the lens 50 and focused onto the scanning disc 52. A mask with a suitably shaped opening 54 is interposed between this disc and the photocell 56. This photocell is preferably of the photomultiplier type, but need not be so limited. The opaque disc 52 has half of its area covered by a red filter 54, and the other half by a blue filter 56. Each half is, moreover, provided with a set of openings so located that during one revolution of the disc they scan the entire area of the opening 54 in the mask 53. Perhaps the simplest arrangement of the holes is a single spiral in each of the colored halves of the disc. Other arrangements of holes can be used. For instance, the holes may be randomly arranged as described in my co-pending application Serial No. 409,901, filed February 12, 1954. All that is necessary is that during each revolution of the disc the entire field of view ahead of the car is separately examined for lights that contain red wave lengths and also for those that contain blue wave lengths. A motor 58 of any suitable type is provided to drive the disc. The shaft of the motor that carries the disc also carries a commutator switch 60 which, in the preferred form, is a single-pole double-throw switch that closes one circuit during the entire time that the red portion of the disc 52 is before the opening 54, and closes another circuit during the entire time that the blue portion of the disc 52 is in front of the opening 54. Photocell 56 is connected to a suitable amplifier 60 or, if its sensitivity is sufficiently high, the amplifier 60 can be dispensed with and the photocell is connected directly to the cathode follower 62, the output of which is connected to the center contact of the single-pole double-throw commutator switch 60 previously described. The "red" contact 62 is connected to a peak detector 66 which is a conventional full wave rectifier containing two diodes, two capacitors and a gain control 70. The output of the "blue" contact 64 is connected to an exactly similar peak detector 68. The gain controls are respectively connected to the grids of two vacuum tubes 74 and 76. To control my headlights I again provide a relay having two windings 78 and 80. The "red" vacuum tube is fed to the winding 78 of the relay. Similarly, the "blue" vacuum tube is fed to the other winding 80. There is this difference, however, between the circuits: the current through the "blue" tube is made to buck or oppose the current of the "red" tube in its action in the relay. The output of the relay consists of a single-pole double throw switch 82 having bright and dim contacts which operate the headlights in a conventional manner.

An additional set of contacts 84 may also be provided to automatically raise the sensitivity of the system in order to provide a lock-in action after the headlights have been dimmed in order to eliminate oscillation if the opposing car also dims its lights. Such means for changing the gain of a dimmer have been previously described in the patent art, including the means shown in Patent No. 2,632,040, issued to me. If the relay 82 has sufficient differential between its pull-in and release currents, the additional gain changing means may not be required and the switch 84 may be eliminated.

The detailed operation of my device is as follows: Assume that the car equipped with this headlight dimmer approaches another car from the rear. The tail lights of the car ahead are emitting light of red color. This light is focused by lens 50 onto the disc 52 thus forming two small points of red light on its surface. As the disc revolves, this red light will be intercepted by one or more holes of the scanning disc, both in the blue and red sections. The light will not be able to pass the blue filter but will pass the red and impinge upon the surface of the photo tube. The output of the photo tube and its cathode follower will then contain short bursts of current which will be passed through the contact 64 of the commutating switch to the peak detector 68. A D. C. voltage will thus be developed across the gain control 72 and a suitable portion of this voltage, depending on the setting of this control, would be impressed on the grid of the vacuum tube 76. If the peak detector is so connected as to produce a positive voltage on the grid of vacuum tube 76, its plate current will rise and the relay 80 will be energized so that its contact leaf will move downward (in Fig. 4), break the bright circuit of the headlights, and make the circuit of the dim lights. This condition will contineu to exist as long as the two cars follow each other at a distance within which the sensitivity of the dimmer is sufficient to hold the relay energized. If the cars separate due to a difference in speed or for any reason, the positive signal on the grid of tube 76 will decrease and the relay will release into its normal, bright, position.

Consider now what happens if, instead of following a car with a tail light, the car carrying this headlight dimmer approaches another car head-on. The headlights of the oncoming car contain both blue and red components of light. The spots of white light focused on the scanning disc 52 will be interrupted again both by the blue and red filters, and the photocell will see the light dots twice per revolution of the disc. Since there will be bursts of current from the amplifier and/or cathode follower, both for the blue and red light, the commutating switch 60 will pass pulses on both cycles of its rotation. Both of the peak detectors will rectify pulses. Each will produce a voltage proportional to the amount of light passing through its respective filter and both vacuum tubes 74 and 76 will increase their current through the relay windings 78 and 80. The magnitudes of these currents will depend on the intensity of the blue and red components of the light of the oncoming vehicle and on the settings of the gain controls. Since the connections to the coils 78 and 80 is such that current increase in coil 80 opposes the current increase in the current of coil 78, it is possible to set the controls in such a way that the relay will not operate no matter how bright is the white light that is impinging on the headlight dimmer. This is not the end required, of course, and so the "blue" gain control is set so as to produce a smaller current in the relay than the "red" output. Thus, white light does operate the relay by pulling down the armature and dimming the lights, but the overall gain of the device to white light can be kept to a sufficiently low level so as not to see headlights at too great a distance.

It can thus be seen that by using red and blue sensitive channels in a headlight dimmer, their respective gains can be so adjusted as to produce a very high gain for a red signal and a lower gain for a white light so that the very great difference between the intensity of headlights and tail lights can be compensated for to any desired degree.

Many other methods of arriving at this differential gain can be employed besides the ones shown. For example, instead of using a double coil relay, mixing circuits in the output of the peak detectors may be employed and the output of the mixing circuit, as shown by way of example in Fig. 5, can be fed to a single tube and a conventional relay having a single coil. In this case the detectors have to be connected so as to produce voltages of opposite polarity so as to produce the bucking action directly in a mixing circuit. Because of the coupling capacitor 86 between the photomultiplier and cathode follower (see Fig. 4), the unidirectional pulses of current in the photomultiplier are differentiated and made to be pulses containing both positive and negative voltages before they are fed to the cathode follower grid and to the subsequent circuitry. It is for this reason that it is a very simple matter to connect the peak detector so as to produce a positive or a negative voltage for the mixing circuits. If it is required that the "red" channels have more gain than the "blue" channels it is entirely possible to place some of the amplification after the commutating switch and amplify the "red" pulses separately. Generally speaking, I prefer to use a common amplifier and do all the switching after it, so that changes in the gain of the amplifier will not affect the relative sensitivity to red and blue light.

Figure 6:
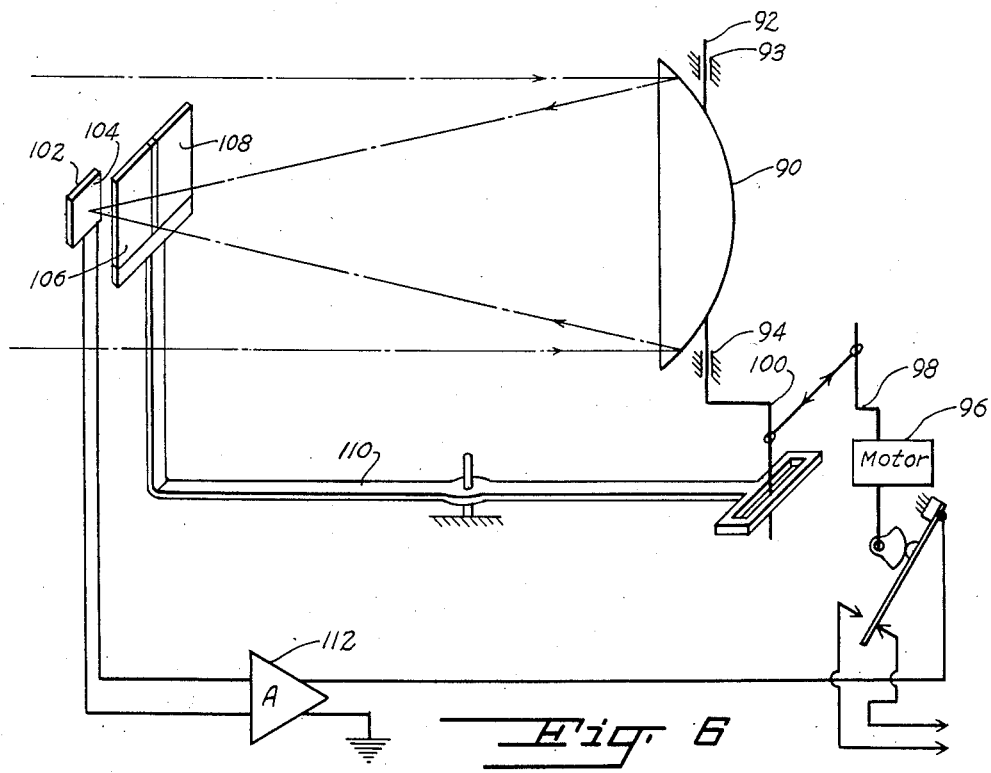
Fig. 6 shows a modification of the invention using a photodiode having a small sensitive area.
Figure 7:
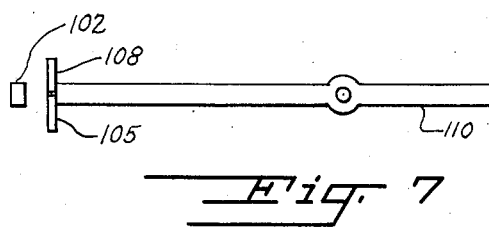
Fig. 7 is a plan view of a detail of Fig. 6.

In my co-pending application Serial No. 388,801, filed October 28, 1953, I show a headlight dimmer where the photo-sensitive surface of the photo detector is much smaller in area than the area of the image of the field of view being covered. This would be the case if a small photo diode or photo transistor were used and the scanning of the field is produced either by moving the photo diode over the image of the field of view or, conversely, by moving the image of the field of view over the photo diode. The latter method is the preferred form of this device and one such embodiment of this approach is shown in Fig. 6. A parabolic or a spherically concave mirror 90 is mounted so that its axis points substantially in the direction of the axes of the headlights mounted on the car. This mirror is attached to a shaft 92 mounted on a set of bearings 93, 94 so that the mirror can oscillate from side to side and cover an angle approximately equal to that covered by the main spread of the light from the headlights. A small motor 96 is provided to oscillate the mirror through an eccentric 98 coupled to a crank 100 attached to the mirror shaft 92. A small photo diode of photo transistor 102 (or any other suitable small photo-sensitive cell) is mounted on the axis of the mirror at its focal point. The amount of light obscured by this cell is small enough to be neglected. The field of view that has to be covered with present day automobiles is essentially a rectangle with a width to height ratio of the order of four. This figure is given only by way of example. It will thus be seen (in Fig. 6) that means are provided for covering the horizontal angle of view by oscillating the mirror. Some means must also be provided to cover the vertical angle. This can be done in one of several ways. The mirror can be oscillated vertically at a high rate of speed, as shown in my co-pending application mentioned earlier. Another, and a satisfactory, method is to use a photocell, the sensitive area of which is made in the form of a thin line. For instance, if the image of the field of view at the plane of the photocell is ¼ inch high and 1 inch wide, a photocell having a vertical height of a quarter of an inch and a width very much smaller, say of the order of one-hundredth of an inch, would be suitable. By using such a thin vertical photocell, shown schematically at 104, in Fig. 6, vertical scanning can be eliminated because images of points of light in the desired field of view would be intercepted by the photocell as the mirror swings from left to right. The electrical efficiency of a photocell of this type is somewhat less than that of a photocell which just barely covers the point image of a small light, but this decrease of efficiency by the increased length of the photocell is justified by the resulting simplicity of the device in the elimination of the need for vertical scanning. Mounted just in front of the photocell is a vertical support carrying two small color filters 106, 108, which may be, again, red and blue. This vertical support is mounted on a pivoted lever 110 provided with a lost motion device at its rear end in which the crank of the mirror shaft operates. If the opening in the lever is just slightly smaller than the throw of the crank 100, this lever will be rocked from side to side by the crank, at the extremes of the crank's motion. The action of this mechanism is illustrated in Fig. 7. It will be noted that as the crank swings to its extreme left and right positions, is moves the lever 110 carrying the color filters 106 and 108 slightly from one side to the other. This places the red filter in front of the photocell for substantially one entire swing of the mirror, and then places the blue filter in front of the cell for substantially the entire return swing of the mirror. In this way the field of view is examined alternately for blue and red light as the mirror oscillates.

Since, to the best of my knowledge, photocells of the size shown in Fig. 6 do not, as yet, possess the sensitivity of photomultipliers, additional amplification will be required, particularly if the size of the light-gathering mirror is kept to a reasonable figure. The design of suitable amplifiers presents no difficulties since the output of the photocells consists of pulses, and simple A. C. amplifiers may be employed. The circuits following the amplifier can be of the type shown in Figs. 3, 4 and 5. If it is desired to have the dimmer respond to the absolute level of the light instead of the relative levels of adjoining small areas of the field of view, it is merely necessary to use a D. C. coupled amplifier 112.

The use of red and blue filters was given in the above descriptions only by way of example. It is assumed that the headlights and tail lights are those normally employed in cars at the present time. A red and green filter may also be employed. While I speak of colors of visible light for convenience, I do not rule out, by any means, the energy in the infra-red and ultra-violet portions of the spectrum. In fact, incandescent lamps peak their energy output in the infra-red and many modern photocells are particularly sensitive to this energy. This makes them particularly attractive for the detection of tail lights where it is desirable to take advantage of all possible gain.

While I show only two color filters for analysis of the light from the car ahead, more complicated schemes can be used using three-color scanning and a three-way commutator, so that an analysis of the oncoming lights can be made more complete. This would be particularly true if lights of other colors in addition to red were used at the rear of an automobile, such as, for instance, orange or yellow. At the present moment, the American passenger cars are apparently standardizing at having only red lights at their rear, and white lights in front.

The various embodiments of my invention shown here are given by way of example only. Other scanning means may, of course, be employed with or without image forming devices. The examples shown are not to be taken as limitations of the principle and what I claim for my invention is the following:

1. In a headlight dimmer for an automobile, photosensitive means responsive to the light from a selected field of view, and headlight control means operated by said photosensitive means to dim the headlights of said automobile in response to light in the field of view, said photosensitive means comprising first means responsive to the intensity of received light in a selected range of the spectrum of the light from said field of view to actuate said headlight control means, at a predetermined intensity of received light and other means responsive to the intensity of light in another range of said spectrum to oppose the effect of said first means.

2. An automatic headlight dimmer control responsive to the radiation in the field of view substantially covered by the headlights which are controlled, comprising first means responsive to the intensity of light in one portion of the radiation spectrum and second means responsive to the intensity of light frequencies of a different range from one said portion, a dimmer circuit controlled by both said means, said second means being connected to reduce the sensitivity of said first means.

3. In a headlight dimmer for an automotive vehicle, means to dim the headlights of the vehicle, scanning means for examining the field of view ahead of the vehicle for bright spots of light, means to divide the spectrum of such bright spots into two portions, means responsive to the intensity of light in each of said portions of the spectrum, and means responsive to the ratio and intensity of such light portions to operate said dimming means.

4. An automatic headlight dimmer comprising photoelectric means responsive separately to two different colors of light from the field of vision to produce a different signal output for each color, and a headlight dimming circuit controlled by the difference of said signal outputs, said photoelectric means comprising two photosensitive cells, a different color filter between each cell and the field of vision, said headlight dimming circuit comprising a dimmer relay and circuit means connecting the respective outputs of said photosensitive cells in opposition to said relay.

5. The invention according to claim 4, and means for adjusting the relative magnitudes of the respective outputs of the photoelectric means.

6. The invention according to claim 5, and optical means for directing light from the field of view toward said photosensitive cells and means for splitting said light into two components and directing each component toward one of said cells.

7. An automatic headlight dimmer comprising photoelectric means responsive separately to two different colors of light from the field of vision to produce a different signal output for each color, and a headlight dimming circuit controlled by the difference of said signal outputs, said photoelectric means comprising a photoelectric cell, a separate color filter for passing each of said two different colors, means for alternately interposing each said filter between the field of view and the photoelectric cell to alternately produce two different electrical outputs from said photoelectric cell, means for separating said outputs and means for supplying said outputs in opposition to said headlight dimming circuit.

8. An automatic headlight dimmer comprising photoelectric means responsive separately to two different colors of light from the field of vision to produce a different signal output for each color, and a headlight dimming circuit controlled by the difference of said signal outputs, and means for exposing said photoelectric means to individual small elemental areas of a selected portion of said field of view, and two separate color filters between said field of view and said photoelectric means for passing respectively any light of said two different colors from each of said elemental areas to produce said different signal outputs.

9. The invention according to claim 8, said means for exposing individual areas comprising scanning disc means.

10. The invention according to claim 8, and means for producing an image of said field of view, said photoelectric means comprising a photocell having a very small sensitive area compared to the area of said image, and means for moving said image with respect to said photocell to produce scanning.

11. In a headlight dimmer for automotive vehicles, headlight means for illuminating a field of view in advance of a vehicle, headlight control means for selectively dimming or raising the beam produced by said headlight means, photosensitive means responsive to light in a first selected spectrum range from a field of view in advance of the vehicle for dimming the headlights at a first predetermined intensity of received illumination in said first spectrum range, said photosensitive means being responsive also to light in a second selected spectrum range from said field of view for dimming the headlights at a second predetermined intensity of received illumination in said second spectrum range, said first and second intensities being substantially different.

References Cited in the file of this patent

UNITED STATES PATENTS

| | | |
|---|---|---|
| 2,375,677 | Moore | May 8, 1945 |
| 2,433,624 | Rabinowitz | Dec. 30, 1947 |
| 2,470,877 | Stuland | May 24, 1949 |
| 2,561,243 | Sweet | July 17, 1951 |
| 2,632,040 | Rabinow | Mar. 17, 1953 |
| 2,648,253 | Sweet | Aug. 11, 1953 |